(12) United States Patent
Smith et al.

(10) Patent No.: US 6,398,287 B1
(45) Date of Patent: Jun. 4, 2002

(54) RETROREFLECTIVE REINFORCEMENT WEBBING APPLIED TO AN OUTER SIDE OF A TARPAULIN

(75) Inventors: Peter R. Smith, Avon; Richard Zanotti, Wethersfield, both of CT (US)

(73) Assignee: Reflexite Corporation, Avon, CT (US)

( * ) Notice: Subject to any disclaimer, the term of this patent is extended or adjusted under 35 U.S.C. 154(b) by 219 days.

(21) Appl. No.: 09/027,173

(22) Filed: Feb. 20, 1998

(51) Int. Cl.⁷ .................................................. B60P 7/02
(52) U.S. Cl. ........................ 296/100.01; 296/100.15; 296/100.16; 296/136
(58) Field of Search ................... 296/100.01, 100.15, 296/100.16, 136

(56) References Cited

U.S. PATENT DOCUMENTS

| | | | |
|---|---|---|---|
| 3,481,371 A | * 12/1969 | Row | 139/419 |
| 3,684,348 A | 8/1972 | Rowland | 350/103 |
| 3,689,346 A | 9/1972 | Rowland | 156/245 |
| 3,712,706 A | 1/1973 | Stamm | 350/103 |
| 3,811,983 A | 5/1974 | Rowland | 156/245 |
| 3,830,682 A | 8/1974 | Rowland | 161/2 |
| 3,975,083 A | 8/1976 | Rowland | 350/103 |
| 3,992,080 A | 11/1976 | Rowland | 350/103 |
| 4,202,600 A | 5/1980 | Burke et al. | 350/103 |
| 4,332,847 A | 6/1982 | Rowland | 428/156 |
| 4,368,982 A | 1/1983 | Van Arnam et al. | 356/445 |
| 4,720,135 A | * 1/1988 | Farina | 296/136 |
| 4,801,193 A | 1/1989 | Martin | 350/103 |
| 5,050,924 A | 9/1991 | Hansen | 296/100 |
| 5,111,554 A | 5/1992 | Sweers | 24/16 R |
| 5,171,624 A | 12/1992 | Walter et al. | 428/156 |
| 5,229,882 A | 7/1993 | Rowland | 359/530 |
| 5,236,751 A | 8/1993 | Martin et al. | 428/40 |
| 5,264,063 A | 11/1993 | Martin | 156/247 |
| 5,376,431 A | 12/1994 | Rowland | 428/164 |
| 5,388,702 A | * 2/1995 | Jones | 206/597 |
| 5,491,021 A | * 2/1996 | Tolliver et al. | 428/217 |
| 5,491,586 A | 2/1996 | Phillips | 359/530 |
| 5,501,545 A | 3/1996 | Walter | 404/14 |
| 5,512,219 A | 4/1996 | Rowland et al. | 264/1.6 |
| 5,558,740 A | 9/1996 | Bernard et al. | 156/231 |
| 5,592,330 A | 1/1997 | Bernard | 359/529 |
| 5,617,247 A | 4/1997 | Rowland | 359/515 |
| 5,637,173 A | 6/1997 | Martin et al. | 156/235 |

FOREIGN PATENT DOCUMENTS

| | | |
|---|---|---|
| DE | 4415042 | 4/1995 |
| WO | WO93/10985 | 6/1993 |
| WO | WO97/16753 | 5/1997 |

OTHER PUBLICATIONS

J. C. Whitney catalog, p. 49, Jan. 1996.*

* cited by examiner

*Primary Examiner*—Joseph D. Pape
*Assistant Examiner*—Lori L Coletta
(74) *Attorney, Agent, or Firm*—Hamilton, Brook, Smith & Reynolds, P.C.

(57) ABSTRACT

A tarpaulin includes a sheet having an outer side and an inner side. A reinforcing webbing is applied to the outer surface of the sheet. A retroreflective sheeting is incorporated onto the reinforcing webbing. A plurality of straps is joined to the retroreflective sheeting on the outer side and for attaching to a perimeter of a vehicle.

8 Claims, 2 Drawing Sheets

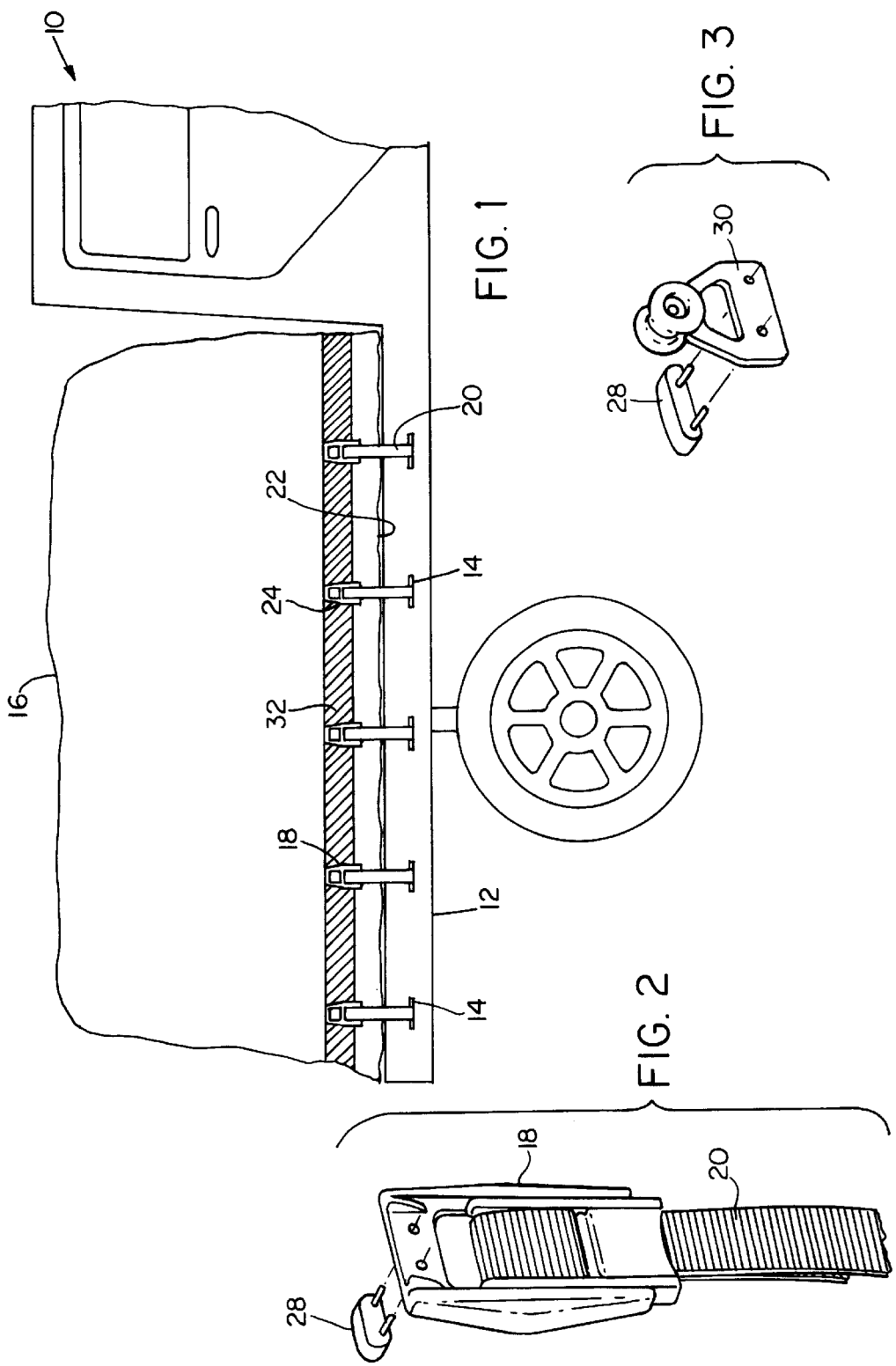

RETROREFLECTIVE REINFORCEMENT WEBBING APPLIED TO AN OUTER SIDE OF A TARPAULIN

BACKGROUND OF THE INVENTION

Retroreflective materials are commonly employed for safety and decorative reasons. In particular, many trucks are marked with conspicuity tape to reduce the incidence of side-on and rear-end collisions. The United States Department of Transportation has promulgated a set of regulations regarding retroreflective conspicuity enhancement systems for commercial vehicles. Other countries are implementing similar regulations.

Full contour marking of commercial vehicles allows viewers to determine the full dimensions of the vehicles. However, often trucks have just a flatbed with a load covered by a tarpaulin. The tarpaulin generally does not show the profile of the load on the truck at night. Previous known tarpaulins can include free-standing retroreflective elements formed on a substrate for application of a retroreflective structure to a preexisting tarpaulin formed of compatible fabrics. For instance, see U.S. Pat. No. 5,637,173.

Therefore, a need exists for a retroreflective system having a cover for a truck load that can enhance the profile of the truck at night.

SUMMARY OF THE INVENTION

In accordance with the present invention, a tarpaulin includes a sheet having an outer side and an inner side. A reinforcing webbing is applied to the outer surface of the sheet. A retroreflective sheeting is incorporated onto the reinforcing webbing. A plurality of straps is joined to the retroreflective sheeting on the outer side and for attaching to a perimeter of a vehicle.

The present invention has many advantages which include improved visibility of the perimeter of the vehicle. The present invention also has the advantage that the retroreflective tape is incorporated onto the reinforcing webbing and is applied to the outer surface of the tarpaulin, thereby not only reinforcing the strength of the tarpaulin but also supplying an element of safety. Also significant is that this configuration allows the retroreflective tape to be applied without additional labor steps.

BRIEF DESCRIPTION OF THE DRAWINGS

FIG. 1 shows a side view of a flatbed truck with the invention.

FIG. 2 shows a detailed view of a buckle and twinfixing for attachment through a retroreflective structure on a tarpaulin.

FIG. 3 shows a detailed view of a roller and twinfixing for attachment through the retroreflective structure on a tarpaulin.

DETAILED DESCRIPTION OF THE INVENTION

Figure 4:
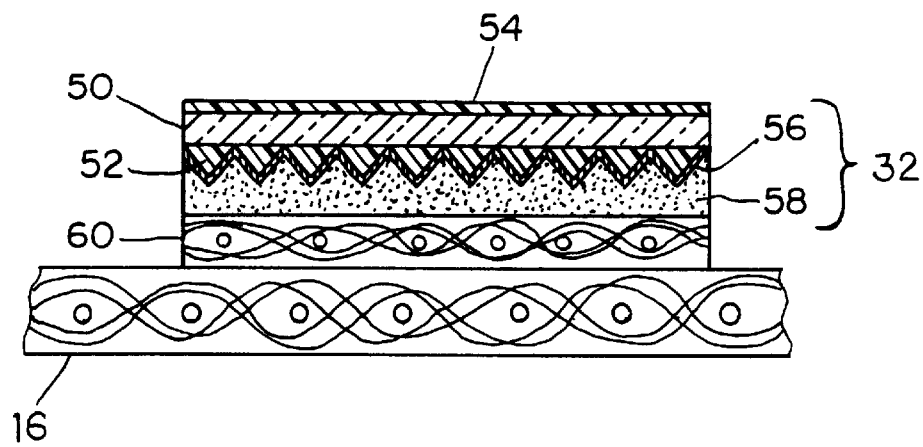
FIG. 4 shows a cross-sectional view of one embodiment of the retroreflective structure and tarpaulin.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All percentages and parts are by weight unless otherwise indicated.

As shown in FIG. 1, truck 10 includes a flatbed 12 which is used to carry large objects. The flatbed, alternatively, can be part of a semitrailer. Around the perimeter of flatbed 12 are strap anchors 14 for attaching straps.

Tarpaulin 16 or curtain is formed of a sheet of cloth, such as canvas, or a synthetic resin, such as polyvinyl chloride (PVC), polyamide, polypropylene or polycarbonate, or fabrics, such as polyester, nylon or the like, coated with a suitable resin. For example, a tarpaulin can be formed with an acrylic lacquer coating. Other tarpaulin substrate materials can include fabric reinforced plastic, fabric reinforced and embossed polyvinyl chloride, coated polyvinyl chloride, polyurethanes and the like. In a preferred embodiment, the tarpaulin is formed with 2×2 850 gram high gloss polyester/polyvinyl chloride. The tarpaulin can hold loads under tension.

A reinforcing webbing is applied to the outside of tarpaulin 16 to provide support for mounting hardware, such as buckles and clips, and for tensioning and attaching the tarpaulin to the side of the trailer. The reinforcing webbing includes woven fibers made of cotton, polyesters, nylon or similar materials that are coated with polymeric material, such as plasticized polyvinyl chloride, that can be bonded to the tarpaulin through various methods, such as heat lamination, ultrasonic welding or radio frequency welding. Radio frequency welding is a preferred method.

Buckle 18 is attached to the outer surface of tarpaulin 16 at a sufficient distance from the perimeter 22 of tarpaulin 16 to allow strap 20 to extend over tarpaulin 16. Buckle 18 is stitched, riveted or attached by any suitable means at anchoring point 24 on tarpaulin 16. The buckle 18 can be fitted using non-corrosive twinfixings for anchoring through the tarpaulin. An example of a buckle 18 is shown in FIG. 2 with strap 20 and rivet anchor 28 for inserting through the tarpaulin 16 from the inner surface. Alternatively, a roller 30 can be used for attaching to a track or contrail section. Such a roller 30 is shown in FIG. 3. In another embodiment, a strap is anchored to the tarpaulin. The strap can then be connected to a set of the strap anchors 14 on the truck 10. Strap 20 extends beyond perimeter 22 of tarpaulin 16. Anchoring points 24 are located a distance from perimeter 22 of tarpaulin 16. Further, the straps can be attached to the tarpaulin along its edges by stitching or any other suitable means.

Strap 20 is a long strip of pliant material, such as nylon, canvas, leather, etc. The width can be in the range of between about one and six inches. Strap 20 is long enough to have a sufficient amount of strap between strap anchor 14 and buckle 18.

Retroreflective materials are typically formed of a sheet of thermoplastic, which has a colorant mixed therein with the polymers. Attached to the sheet of thermoplastic is an array of cube-corner or prismatic retroreflectors as described in U.S. Pat. No. 3,712,706, issued to Stamm on Jan. 23, 1973, the teachings of which are incorporated herein in their entirety by reference. Generally, the prisms are made by forming a master die on a flat surface of a metal plate or other suitable material. To form the cube-corner, three series of parallel equidistant intersecting V-shaped grooves sixty degrees apart are inscribed in the plate. The die is then used to process the desired cube-corner array into a flat plastic surface. When the groove angle is 70 degrees, 31 minutes, 43.6 seconds, the angle formed by the intersection of two cube faces (dihedral angle) is 90 degrees and the incident light is retroreflected back to the source.

The efficiency of a retroreflective structure is the measure of the amount of incident light returned within a cone diverging from the axis of retroreflection. A distortion of the prismatic structure adversely affects the efficiency. Furthermore, cube-corner retroreflective elements have low angularity at some orientation angles, for instance, the elements will only brightly reflect light that impinges on it within a narrow angular range centering approximately on its optical axis. Low angularity arises from the inherent nature of these elements which are trihedral structures having three mutually perpendicular lateral faces. The elements are arranged so that the light to be retroreflected impinges into the internal space defined by the faces, and the retroreflection of the impinging light occurs by internal retroreflection of the light from face to face of the element. Impinging light that is inclined substantially away from the optical axis of the element (which is a trisection of the internal space defined by the faces of the element) strikes the face at an angle less than its critical angle, thereby passing through the face rather than being reflected. Further details concerning the structures and the operation of cube-corner microprisms can be found in U.S. Pat. No. 3,684,348, issued to Rowland on Aug. 15, 1972, the teachings of which are incorporated by reference herein in their entirety. The disclosed method is for forming cube-corner microprisms in a cooperatively configured mold. The prisms are bonded to sheeting which is applied thereover to provide a composite structure in which cube-corner microprisms project from one surface of the sheeting.

The array of retroreflectors includes optical elements that are known in the art, such as cube-corner prisms, four-sided prisms, Fresnel lenses, glass beads, rounded lenses, etc. In one embodiment, the array of retroreflectors has a window side and a facet side. The array of retroreflectors can be formed of a transparent polymer that can be selected from a wide variety of polymers that include the polymers of urethane, acrylic ethers, hard epoxy acrylates, etc. Other polymers include polycarbonates, polyesters and polyolefins, acrylated silanes and urethane acrylates. Other types of polymers that are flexible can include polyvinyl chloride, polyvinylidene chloride, polyethylene, polypropylene or any other type of flexible thermoplastic. Preferably, the polymer is cast in a mold with a monomer or oligomer, and the polymerization is initiated by ultraviolet radiation. Preferably, the array of retroreflectors is formed of cube-corner prism elements having a length along each cube side edge in the range of between about 0.002 and 0.04 inches. In a preferred embodiment, the prism elements have a length along each cube-side edge in the range of between 0.0049 and 0.02 inches. In a particularly preferred embodiment, each cube-side edge has a length of about 0.0049 inches.

An adhesive can be applied to the prism facets for attaching a backing layer to the retroreflective structure. If an adhesive is employed on the prism facets, the adhesive can cause the surface of the prisms to wet, thereby destroying the air interface and eliminating the ability of the prism to retroreflect. As a result, the reflective coating is preferably deposited on the surface of the dihedral facets. Typically, the reflective coating is formed by sputtering aluminum, silver or gold or by vacuum metalization. Alternatively, metal lacquers, dielectric coatings and other specular coating materials can be employed.

Retroreflective structure 32 is attached to tarpaulin 16. The retroreflective structure 32 can be formed by numerous methods. Some of the methods for forming a retroreflective structure are disclosed in U.S. Pat. No. 3,684,348, issued to Rowland on Aug. 15, 1972; U.S. Pat. No. 3,689,346, issued to Rowland on Sep. 5, 1972; U.S. Pat. No. 3,811,983, issued to Rowland on May 21, 1974; U.S. Pat. No. 3,830,682, issued to Rowland on Aug. 20, 1974; U.S. Pat. No. 3,975,083, issued to Rowland on Aug. 17, 1976; U.S. Pat. No. 4,332,847, issued to Rowland on Jun. 1, 1982; U.S. Pat. No. 4,801,193, issued to Martin on Jan. 31, 1989; U.S. Pat. No. 5,229,882, issued to Rowland on Jul. 20, 1993; U.S. Pat. No. 5,236,751, issued to Martin et al. on Aug. 17, 1993; U.S. Pat. No. 5,264,063, issued to Martin on Nov. 23, 1992; U.S. Pat. No. 5,376,431, issued to Rowland on Dec. 27, 1994; U.S. Pat. No. 5,491,586, issued to Phillips on Feb. 13, 1996; U.S. Pat. No. 5,512,219, issued to Rowland on Apr. 30, 1996; U.S. Pat. No. 5,558,740, issued to Bernard et al. on Sep. 24, 1996; U.S. Pat. No. 5,592,330, issued to Bernard on Jan. 7, 1997; and U.S. Pat. No. 5,637,173, issued to Martin et al. on Jun. 10, 1997. The teachings of each patent are incorporated herein by reference. Retroreflective structure 32 is attached by a suitable means, such as by sewing or an adhesive.

The retroreflective structure 32 is bonded to the webbing prior to its application to the tarpaulin 16. The bond can be achieved through any number of means, such as pressure sensitive adhesive, heat activated adhesive or radio frequency welding. A preferred method is to use a heat activated adhesive of a type suitable for adhesion to plasticized polyvinyl chloride. One such type is formed of a polyurethane resin. The retroreflective structure can also be applied in-line with the webbing as it is being bonded to the tarpaulin using any of the afore mentioned methods for bonding. The webbing can be in any desirable and practical width, such as in the range of between about 1.5 and 3.0 inches wide with two inches being preferred. In another embodiment, an air-backed retroreflective prism system can be radio frequency welded on a backing sheet of prism system to the webbing.

As shown in FIG. 4, retroreflective structure 32 is formed with a transparent polymer film 50, such as polyvinyl chloride, having prism elements 52 on one side and a surface protective coating 54, such as a crosslinked polyurethane for providing ultraviolet light protection and dye blocking on the second side of the polymer film 50. In one embodiment, the polymer film 50 has a thickness in the range of between about 0.0001 and 0.02 inches and the surface protective coating 54 has a thickness in the range of between about 0.0001 and 0.004. A metalized reflective coating 56 is deposited on the facets of the prism elements 52. Preferably, the coating includes aluminum, silver or gold. A heat activated adhesive 58, such as polyurethane, is applied to the metalized reflective coating 56. An example of a suitable heat activated adhesive includes a thermoplastic urethane available from Sarnatech Xiro AG under the name of Guttacoll Puro H. In another embodiment, the adhesive 58 has a thickness in the range of between about 0.001 and 0.006 inches. A webbing 60, such as a polyvinyl chloride coated fabric, is applied to the adhesive 58 and is heat laminated with retroreflective structure 32, which includes polymer film 50, prism elements 52, surface protective coating 54 and metallized reflective coating 56. In a preferred embodiment, the webbing 60 includes a reinforced fabric laminated onto retroreflective structure 32. The retroreflective structure 32 is welded by a suitable method, such as radio frequency, to a tarpaulin 16, such as a vinyl coated tarpaulin fabric.

Figure 5:
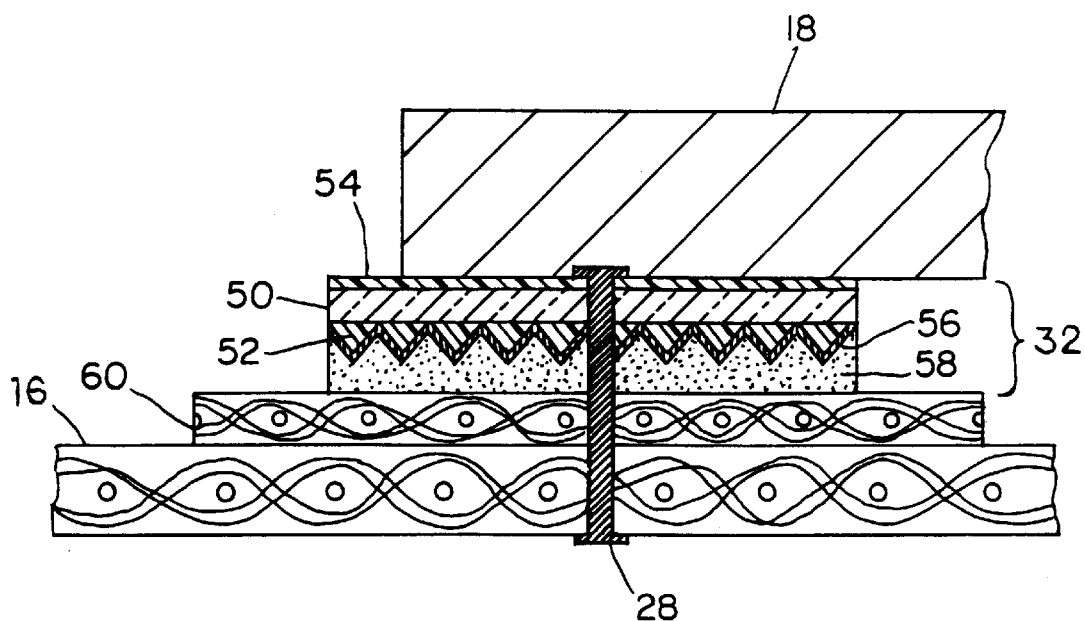
FIG. 5 shows a cross-sectional view of a second embodiment of the retroreflective structure and tarpaulin.

In another embodiment as shown in FIG. 5, webbing 60, which is significantly wider than polymer film 50, can be applied. This forms a structure that can have a first color in the polymer film 50, such as yellow, while the webbing 60 can have a second color that is different from the first color. This can create a two-tone appearance with the webbing and retroreflective strap on the tarpaulin 16. For example, polymer film 50 can have a width of about two inches and webbing 60 can have a width of about three inches. In another embodiment, the polymer film 50 and webbing are color matched to blend together. The rivet anchor 28 is inserted through tarpaulin 16, webbing 60, adhesive 58, prism elements 52, transparent polymer film 50 and coating 54 for attaching to the buckle 18.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A tarpaulin comprising;
    a) a sheet having an outer side and an inner side;
    b) a reinforcing webbing applied to the outer side of the sheet;
    c) a retroreflective sheeting incorporated onto the reinforcing webbing; and
    d) a plurality of non-elastic straps joined to said retroreflective sheeting on said outer side and for attaching to a perimeter of a vehicle.

2. The tarpaulin of claim 1 wherein said retroreflective sheeting is attached to said webbing by an adhesive.

3. The tarpaulin of claim 1 wherein said retroreflective sheeting is attached to said webbing by stitching.

4. The tarpaulin of claim 1 wherein said retroreflective sheeting is attached to said webbing by welding.

5. The tarpaulin of claim 1 wherein retroreflective sheeting includes cube-corner prism elements.

6. The tarpaulin of claim 5 wherein the cube-corner prism elements include a metalized layer on a facet side of the elements for specular reflection.

7. The tarpaulin of claim 1 wherein said retroreflective sheeting extends around the perimeter of said sheet.

8. The tarpaulin of claim 1 wherein said plurality of straps are joined to said retroreflective sheeting by a buckle.

* * * * *